May 11, 1937.  A. C. FISCHER  2,080,386
METHOD AND APPARATUS FOR MANUFACTURE OF SHEET SURFACING MATERIALS
Filed March 26, 1927   5 Sheets-Sheet 4
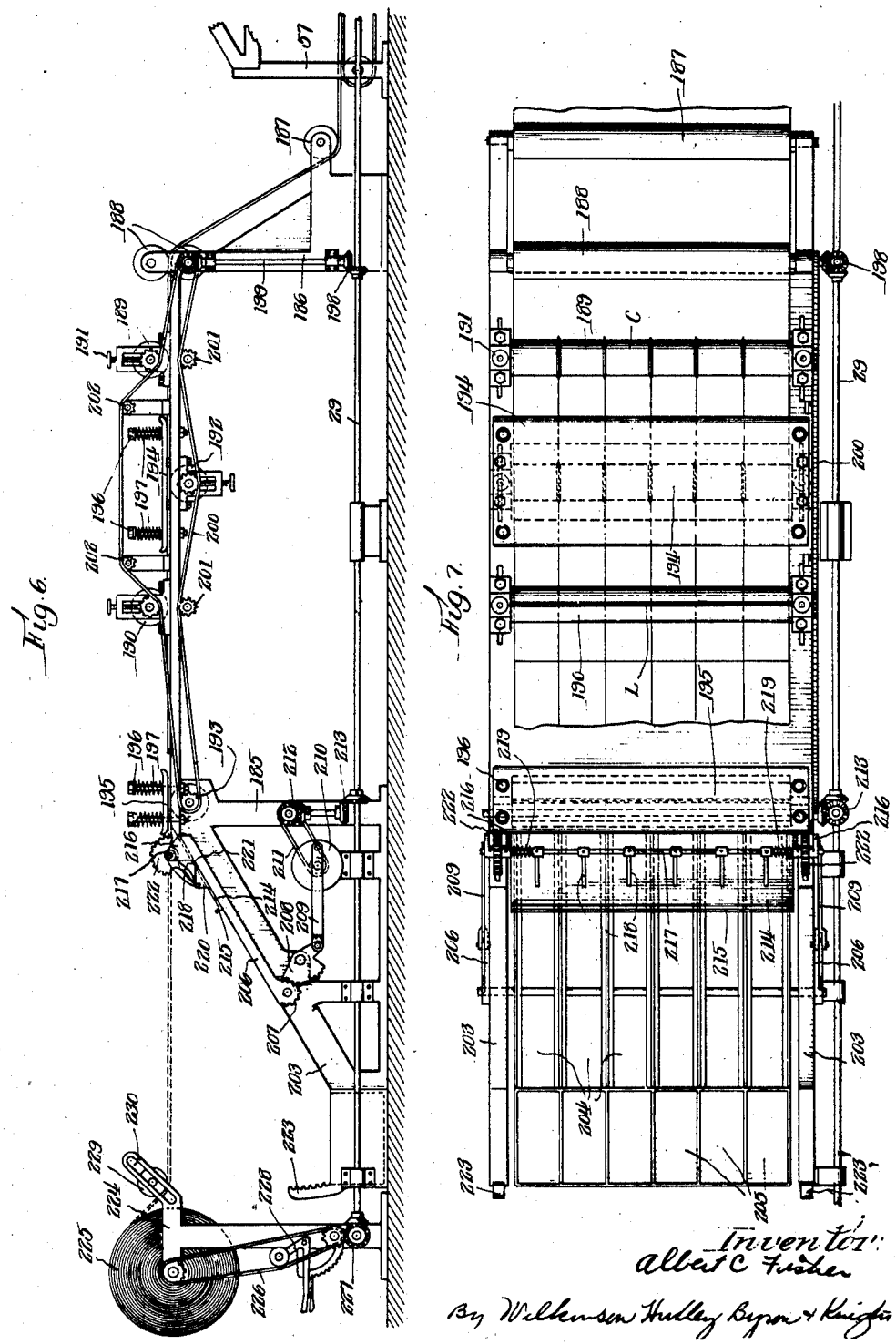

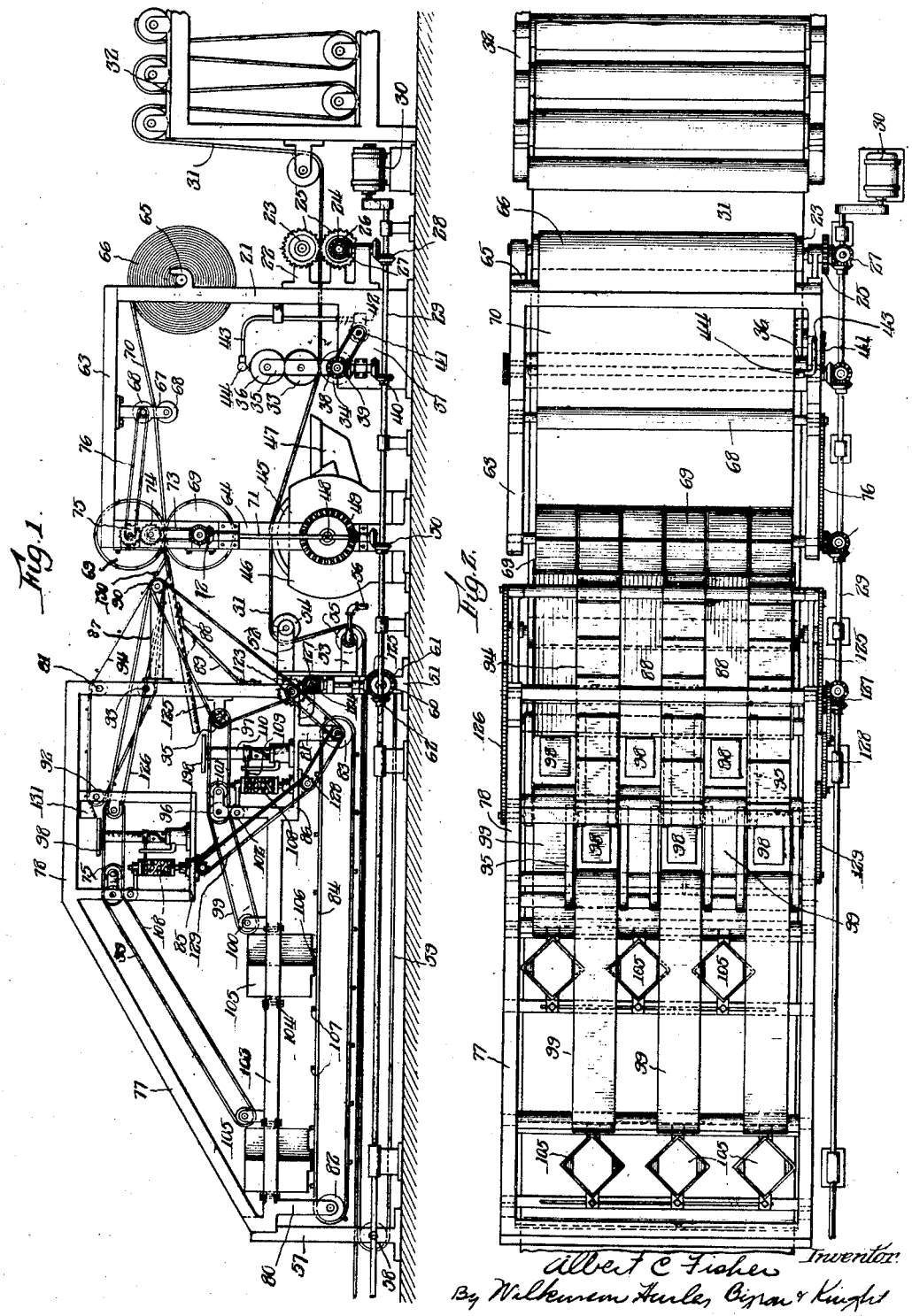

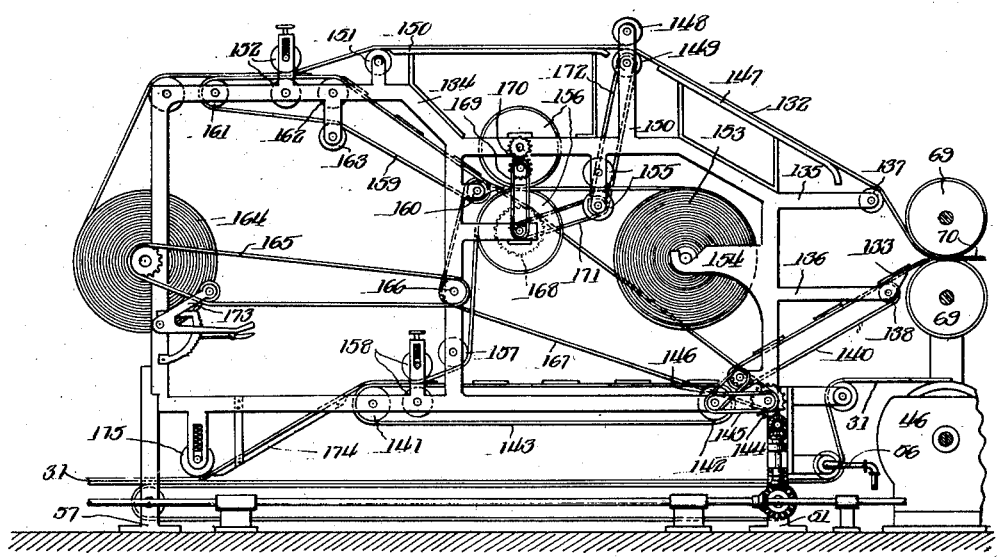

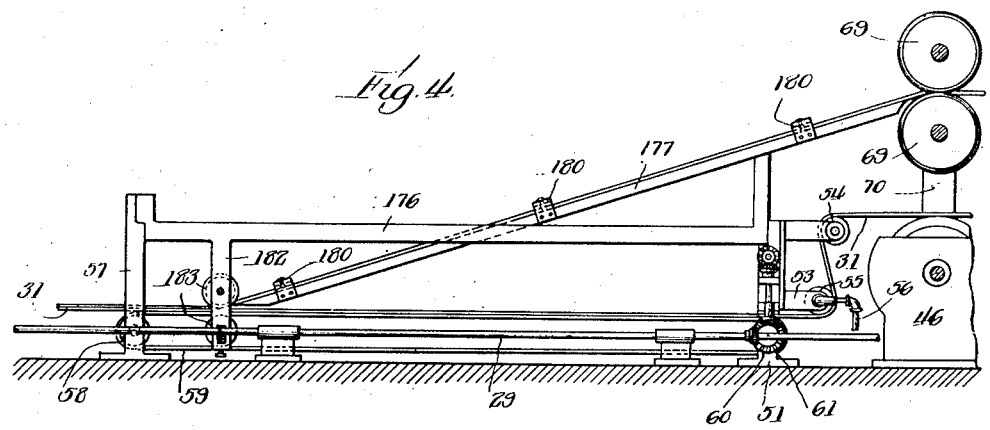
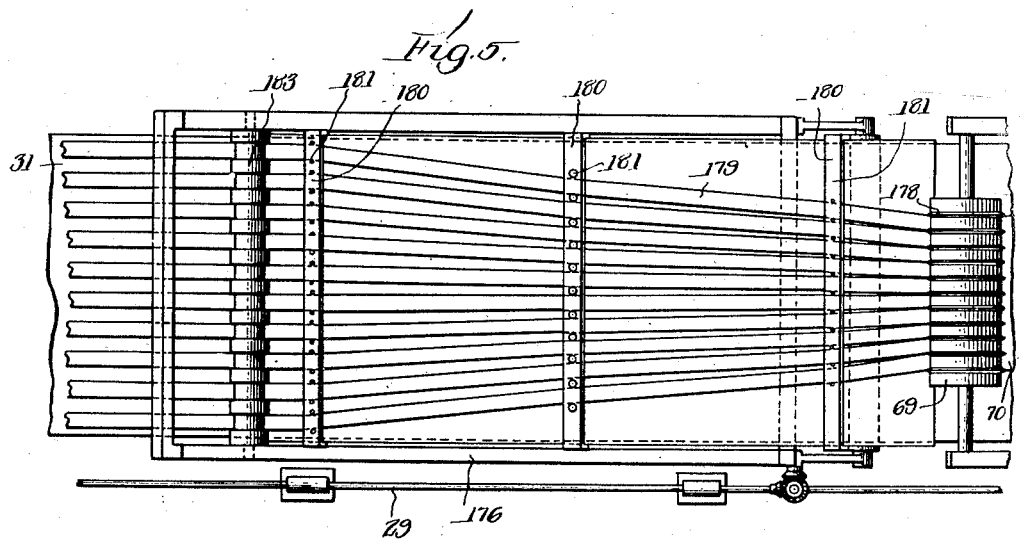

May 11, 1937. A. C. FISCHER 2,080,386
METHOD AND APPARATUS FOR MANUFACTURE OF SHEET SURFACING MATERIALS
Filed March 26, 1927 5 Sheets-Sheet 5
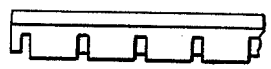
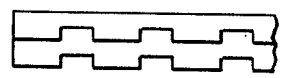
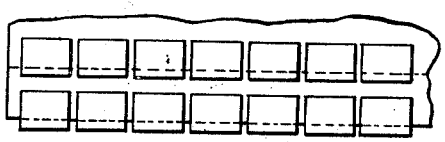
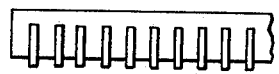
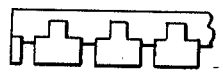
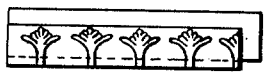
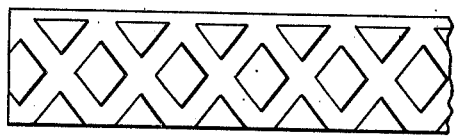
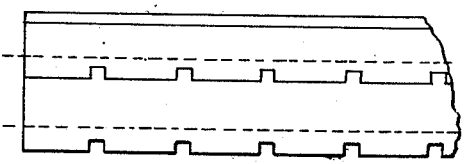
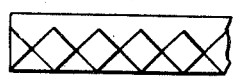
Inventor
Albert C Fischer
By Wilkinson, Huxley, Byron & Knight Patented May 11, 1937

2,080,386

UNITED STATES PATENT OFFICE 2,080,386

METHOD AND APPARATUS FOR MANUFACTURE OF SHEET SURFACING MATERIALS

Albert C. Fischer, Chicago, Ill., assignor to The Philip Carey Manufacturing Company, a corporation of Ohio Application March 26, 1927, Serial No. 178,631

25 Claims. (Cl. 154—38)

My invention relates to a machine for and method of producing sheet surfacing material.

My invention relates particularly to a machine and method for forming roofing material, the machine being adapted to form roofing in many different forms and particularly having designs thereon in bas relief, and is typified by a machine for manufacturing roofing. However, it will be understood that this is only for the purpose of illustration and that sheet surfacing material, such as, floor and wall covering may be manufactured as well as roofing.

This invention is a continuation in part of my co-pending application, Serial No. 411,629, filed September 20, 1920, entitled Apparatus for manufacture of sheet surfacing materials, and which issued October 1, 1929 as Patent No. 1,730,065.

It has been customary heretofore in the manufacture of composition roofings to produce the same in the form of a smooth surfaced roofing, grit roofings having a plain uniform color, grit surfaced roofings with designs stamped, formed, impregnated or stenciled thereon, and hand types wherein the molding substances pressed into form and coated were fed onto the under sheet to form thereon an adhesive coating with the under surface.

Such roofings as above described, especially in large cities, in the course of a year or two become soiled or dirty with the result that the design or color gives place to a dirty gray or black cast and is no longer distinguishable from any roofing made of an inferior material.

One of the objects of this invention is to provide a machine which is capable of making roofing material in bas relief and which is provided with means whereby the lower base sheet of roofing material may have superimposed thereon a plurality of individual shingles in any desired spaced relationship, or a plurality of strips, or a second sheet cut with a stencil design, all in a manner to give any desired bas relief effect to the roofing material.

Another object of my invention is to provide a machine which is capable of making shingles of single thickness or of two thicknesses, superimposed one upon the other, offset or otherwise.

Another object of my invention is to provide a machine having a portion which is readily removable and replaceable by a substitute portion whereby the function of the original portion of the machine may be substituted by a second operation which will effect the formation of a different type of roofing.

It is a further object of my invention to provide a mechanism which will receive the roofing in its completed form as a strip from the first portion of the machine and which is provided with means which may be selectively operated to form the roofing into transverse strips or individual shingles as desired, it being understood that if sheet roofing material is desired that the last apparatus is not employed in the process of formation in such instance, it being provided with a roll for receiving and winding the material thereon.

Another object of my invention is to provide means in connection with my machine for making an inlaid sheet to be placed on a base sheet to give a completed roofing roll of desired appearance.

A further object of my invention is to provide mechanism making up the machine for accomplishing the results set forth in the above stated objects and one which is simple and efficient in operation as well as inexpensive to manufacture and operate.

These and other objects are accomplished by means of the arrangement disclosed on the accompanying sheets of drawings, in which—

Figure 1 is a side elevation of a portion of the machine for making roofing in bas relief, having shingles placed in superposed relation on top of the base sheet;

Figure 2 is a plan view of Figure 1;

Figure 3 is a plan view of the portion of the machine to be substituted for the shingle forming portion of the machine shown in Figure 1 and which is employed to make an inlaid upper layer of roofing to be placed on the lower base sheet;

Figure 4 is a side elevation of a portion of my machine which is also capable of being substituted for the shingle forming apparatus shown in Figure 1 but which is designed to form the upper sheet into a plurality of longitudinal strips to be placed on the base sheet;

Figure 5 is a plan view of Figure 4;

Figure 6 is a side elevation of an additional part of my machine which is placed at the left hand end of the apparatus shown in Figure 1 and which may be selectively employed to form shingles or transverse strips of roofing, and also is provided with a stacking apparatus in the event shingles are to be formed;

Figure 7 is a plan view of Figure 6;

Figure 8 is an enlarged perspective view of one of the reciprocating and oscillating tables employed in the shingle forming machine shown in Figure 1;

Figure 9 is a fragmentary cross sectional elevation of the base portion of the oscillating and reciprocating table shown in Figure 8; and Figures 10 to 20 inclusive show various forms of roofing which may be made on my machine, certain forms being made with the employment of the replaceable portion of the machine shown in Figure 1, and certain other forms being made by the employment of the substitute portions of the machine shown in Figures 3 and 4.

The various novel features of the invention will be apparent from the following description and drawings and will be particularly pointed out in the appended claims.

Referring to Figure 1, it will be noted that my invention embodies a frame member 21 having a bracket 22 mounted thereon which supports the pair of feed rolls 23 and 24 driven by suitable gears 25 in mesh with each other. The lower gear is provided with a beveled gear 26 in mesh with a second beveled gear 27 which is driven through beveled gears 28 from a shaft 29 and motor 30. Fed between the feed rolls is a strip of roofing material 31 which is supplied from any suitable rolls such as a drying rack 32 supplied with spaced pulleys for guiding the strip thereover and into the machine for forming the roofing material. The web 31 which is usually of saturated felt then passes between rollers 33 and 34 which apply asphalt in heated condition to the opposite faces thereof. The roller 34 is mounted on a bracket 35 which also supports the upper roller 33 and a third roller 36. The bracket 35 is carried on the edge of a container 37 adapted to receive the heated asphalt at such level that the roller 34 will dip therein and accordingly deposit a coating of asphalt on the lower surface of the felt. The lower roller 34 is provided with a beveled gear 38 in mesh with a beveled gear 39 which is driven through other beveled gears 40 from the shaft 29. The drive of the two upper rollers 33 and 36 is effected on the opposite side of the machine in a manner to give the correct rotation.

Driven from the shaft on which the roller 34 is mounted is a sprocket chain 41 which rotates a pump 42 which pumps the heated asphalt up through the pipe 43 to the spray nozzle 44 onto the upper roller 36. The upper roll is replaceable and is provided with a surface of any desired type whereby the asphalt will be transferred from the roll 36 to the intermediate roll 33 in such manner that the roll 33 will receive the asphalt on certain portions of its surface and be free from the asphalt on certain other portions, the areas being of any particular relative size and shape in accordance with the pattern which is desired in the finished roofing. The upper roll 36 may have a smooth outer surface, in which case the entire surface of the roll' 33 would have asphalt transferred thereto. Accordingly, it will be understood that roller 33 transfers an asphalt coating to the upper surface of the web 31 either over its entire surface or over certain limited areas of its surface in accordance with some particular design.

From this point, the web 31 which is provided with a coating of asphalt on its under surface, passes over the sanding roll 45 which is pivoted to rotate in a housing 46 provided with an inlet 47 for sand, the roll 45 being constructed with pockets on its periphery whereby it will pick up sand and deposit it as a coating on the under surface of the web 31. The roll 45 is pivoted on a shaft 48 provided with a beveled gear 49 driven through suitable beveled gears 50 from the shaft 29.

Mounted in fixed relation to the machinery above described is a pedestal 51 on which brackets 52 and 53 are provided, forming mountings for the rollers 54 and 55 respectively. The roller 55 is a steam heated roller having a steam pipe 56 introduced through the hub portion thereof. Mounted in spaced relation with the pedestal 51 is a second pedestal 57 having a pulley 58 mounted in the lower portion thereof and forming one of the supports for a conveyor belt 59 which is supported at its other end by a roller 60 mounted in the pedestal 51. The shaft carrying the roller 60 is provided with a beveled gear 61 which is driven by a second beveled gear 62 from the shaft 29.

As seen in Figure 1, the web 31 passes over the roller 54 and under the steam heated roller 55 and onto the conveyor 59 which supports it through this portion of the machine. The frame 21 is provided with a cross bar 63 at its upper end, the other end of which bar is supported on a second frame member 64. The frame 21 is provided with a supporting bearing 65 for supporting in pivotal relation the roll of roofing material 66. Depending from the intermediate portion of the cross bar 63 is a bracket 67 on which are mounted a pair of feed rolls 68. Mounted on the frame support 64 are a pair of cutting rolls 69—69 which are positioned in removable bearings so that they may be replaced and which are constructed in a manner to cooperate with each other to cut the second web of material 70 passing therebetween. This apparatus is driven from the shaft 71 which is rotated by beveled gears 50 from shaft 29, the lower roller 69 being driven through beveled gears 72 and the upper roller being driven by the chain 73 and cooperating support gears 74 and 75. The feed rolls 68 are driven by means of the flexible chain element 76 driven from the shaft of the upper cutting roll 69.

The apparatus thus far described is employed in connection with the operation of the machine for making all types of roofing with the advantage of providing other cutting rolls for those at 69, the purpose being to effect the cutting of the web 70 in any manner desired for a particular type of roofing.

Mounted on the pedestals 51 and 57 is one of the units of my machine which may be removed and replaced depending upon the type of roofing desired and I will now describe the unit shown in Figure 1 which is designed to form the web 70 into a plurality of individual shingles of any desired formation and for retaining the shingles in any desired angular relation relative to the longitudinal path of the base web 31, and subsequently depositing the shingles so formed and positioned onto the upper surface of the web, which has been coated with asphalt on the appropriate areas, for receiving and sticking the shingles thereto. This replaceable unit is designated generally as 77 and it comprises a frame 78 having depending brackets 80 and 81. Mounted in the brackets are rolls 82 and 83 over which is trained a conveyor belt 84. The frame 78 is also provided with two tables 85 and 86 spaced longitudinally relative to each other and positioned in different horizontal planes. A bracket 87 is attached to the frame 78 and projects horizontally outwardly in a position adjacent the opening between the cutting rolls 69—69 mounted on the supporting frame 64. Also provided on the frame 78 is a guiding chute 88 which is supported by a bracket 89 and has its upper end positioned between the rolls 69—69 in a manner to receive alternate shingles cut from the web 70 by the roll 69. On the outer end of the bracket 87 a roll is provided mounted on a shaft 90, and other rolls 91, 92 and 93 are provided in the frame for receiving the conveyor belt 94. Rolls 95 and 96 are also provided in the frame for receiving the two-part conveyor belt 97. The conveyor belt 97 is made up of spaced endless belts having positioned therebetween the reciprocating and oscillating table 98 having suitable mechanism for effecting its movement to be hereinafter described. The conveyor belts and sliding table on supporting platforms 85 and 86 are substantially the same except for the length and directions of the conveyor belts, but one description will serve for both and like reference numerals applied to these parts will indicate corresponding elements.

A second conveyor belt 99 of a width substantially equal to that of the table 98 is provided at one end of the conveyor 97 in a manner to receive shingles formed and at the left hand end, as shown in Figure 1, this belt is supported on rollers 100 and 101, the latter being positioned closely adjacent the edge of the table 98 so as to aid in supporting the shingles immediately after the conveyor belts 97 have removed the shingles from the table 98. The belt 99 is provided with a slightly angular bend as shown, an upper run being guided by the roller 96 and the lower run being guided on the roller 102. Carried on the horizontal beam 103 of the frame 78 are spaced supporting bars 104 between which are positioned a plurality of receiving boxes 105 which are of the shape of the cut shingles and which are disposed in a proper angular relation relative to the longitudinal travel of the web 31 to receive the shingles in the angular position to which they are turned by the table 98. The boxes 105 are provided with slotted bottoms as indicated at 106 so that the projections 107 extending up from the bottom of the conveyor belt 84 may project therein and cause the removal during the travel of the belt of a counter-clockwise direction of one shingle and deposit the shingle so carried from the end of the conveyor onto the base sheet.

Referring now to Figures 1 and 8, it will be noted that the mechanism for causing the movement of the oscillating and reciprocating table comprises a rotating cylinder 108 having a cam groove therein which will cause the finger element 109 mounted on the shaft 110 of the table to reciprocate up and down during rotation. As shown in Figure 8, the finger element 109 is mounted in a guideway 111 therefore mounted on the base element 112. Referring to Figure 9, it will be noted that the finger element 109 is provided with a collar 113 closely surrounding the shoulder 114 provided on the shaft 110. This connection permits a relative rotation between the collar and the shaft but causes the reciprocatory movement of the collar 113 to be imparted to the shaft during the rotation of the cylinder 108. The shaft 110 is mounted in the base 112 in a manner to permit a reciprocation, the upper portion of the base 112 being provided with an angularly adjustable collar 115 having a projection 116 thereon. The shaft 110 is cut out as at 117 in a manner to receive the cam groove plate 118 which is secured by suitable means such as bolts 119. The initial position of the table 98 will be determined by the angular position of the collar 115 on the base member which may be adjusted by the bolts 120 which fit in the slots 121. It is also possible by this mechanism to substitute for the cam plate 118 having the cam slot 122, other plates which have slots of any desired curvature whereby any desired amount of oscillation may be effected for a predetermined vertical travel of the table 98. It is also possible to provide a vertical slot in place of the cam slot, in which case the table will be locked against oscillation during reciprocation.

The parts of this mechanism are so designed that when the table reciprocates, it passes slowly below the horizontal level of the conveyor belt 97, and at the point where it passes between the two parts of the conveyor belt 97, the table is always positioned in a direction longitudinally of the machine so that there will be no interference between the table and the belt. The angular position of the table, therefore, is alway effected at the upper portion of its movement so that it will be in an angular position relative to the conveyor belt 95 when it receives the shingles from the chute or the conveyor 94 as the case may be. It is to be understood that the frame 78 is readily removable and replaceable and that the drive for the entire mechanism is supplied through the gear 123 mounted in the lower right hand corner of the frame, as shown in Figure 1. This gear is adapted to mesh with a second gear driven through the beveled gears 124 and 125 from the shaft 29. When the frame is removed, the gear is lifted out of mesh and when it is put in place, it is caused to assume a driving relationship therewith.

From the shaft on which the gear 123 is mounted. the upper conveyor 94 is driven by a sprocket chain 125 which chain also drives the lower conveyor belts 97 and 99. The upper conveyor belts 97 and 99 are driven by a flexible chain 126 from one end of the conveyor 94. The lowermost conveyor is driven from the shaft carrying the sprocket 123 by chain 127 and by means of chains 128 and 129, the rotating cylinders 108 being rotated to effect an operation of the reciprocating and oscillating tables 98. Positioned at the outer end of the chute element 88 are guide plates 130 disposed in staggered relation with the chute 88 in a manner to receive alternate shingles cut from the rolls 69 so that when the web 70 is fed between the roll 90, alternate shingles are directed down the chute 88 and alternate shingles are directed by the guide element 130 onto the upper conveyor 94. At the other end of the conveyor 94 mounted on the frame is a suitable guide plate 131 for directing the shingles from the conveyor 94 onto their respective tables 98.

From the description of this mechanism, it will be understood that the base web 31 is fed through in a manner to receive hot asphalt on its lower surface and hot asphalt on its upper surface either on its entire area or on certain portions of its area in a predetermined manner, and subsequently to have its under surface coated with sand by the roll 45 and then to pass on through the machine and under the steam heated roll 55 in a manner to render the asphalt thoroughly sticky in a manner to receive the shingles to be subsequently deposited on its upper surface. The roll of material 66 from which the web 70 is supplied is then fed by the roll 68 to the cutting roll 69 by mechanism driven in synchronism with the feeding and tarring of the base web 31.

The sheet by the action of the roll 69 is cut into individual shingles, alternate ones of which are carried upwardly by the conveyor 94 and alternate ones of which are directed down by the chute 88 so that the upper ones are received on the upper reciprocating and oscillating table 98 and the lower ones on the lower table 98. The tables 98 positioned on the lower platform and those positioned on the upper platform are positioned in staggered relation so that they will be in longitudinal alignment with alternate shingles as cut from the roll 69. The shingles are then through the action of the oscillating and reciprocating tables, deposited onto their respective belts 97 in an angular position to the longitudinal whereby they are subsequently carried by the belts 97 and the belts 99 and deposited into their respective boxes 105. From this point they are removed by the action of the pins 107 on the belt 84 passing through the slots 106 and deposited on the base web 31 in a manner to register with the areas of the upper surface of the web 31 which have been previously coated with asphalt by asphalt coating rolls 33 and 36. From this point the material may be rolled into a completed strip of roofing on a roll to be hereinafter described, or may be selectively retreated by mechanism shown in Figure 6 in a manner to form transverse strips of roofing or double-ply shingles as desired. This operation will be hereinafter explained.

Referring now to Figure 3, it will be noted that I have provided an alternative mechanism to be substituted for the frame designated generally as 77 in the above description and shown in Figure 1, which mechanism subjects the web 70 to an alternative process for forming inlaid strips to be placed on the base strip for an alternative form of roofing. This mechanism is so designed and proportioned as to properly fit on pedestals 51 and 57 in the same manner as the frame 77 and to be driven by the same gearing in substantially the same manner. It also has portions projecting to a point in close proximity to the cutting rolls 69 in a manner to receive the parts of the web as they are cut and pass therefrom.

In connection with this feature of my invention, the rollers 69—69 are of such form that the web is cut in the manner of a stencil so that certain areas of the web are cut therefrom leaving a skeleton portion designated in Figure 3 as 132. The cut-out portions 133 pass downwardly therefrom. This mechanism comprises a frame 134 having brackets 135 and 136 projecting toward the cutting rollers 69 on which are mounted the rollers 137 and 138 respectively. A second roller 139 is mounted in the frame and acts with the roller 138 to support the conveyor belt 140. Positioned in the lower portion of the frame are two rolls 141 and 142 over which passes the conveyor belt 143. These two conveyors are driven from a gear 144 which is substantially like the gear 123 on the frame 77 by means of the belts or chains 145 and 146. A guide table 147 is carried by the upper portion of the frame and feeding rolls 148 and 149 are mounted in a bracket 150 on the upper portion thereof.

Mounted on the side of the feed rolls opposite the supporting table 147 is a second supporting table 150 and a roll 151, all of which co-act to feed and direct the skeleton of the web 70 upwardly from the cutting roll 69 to the upper portion of the frame and between the spring pressed pressure rolls 152. Positioned in between the path of travel of the upper skeleton portion 132 and the cut-out portion 133 is a roll of roofing material 153 mounted on a suitable bracket 154, which material is of the same width and preferably of the same texture of the web 70 but of a contrasting color thereto. The roll of material 153 is supplied to the web 31 between the feed rolls 155 and thence to the cutting rolls 156—156. These last named cutting rolls are exactly like the rolls 69—69 employed in this connection so that the cut-out portions from the web 153 will be of a suitable shape and size to fit in openings provided in the skeleton portion 132 of the web 70 and also that the skeleton portion of the web 153 will be of proper configuration to be directed downwardly and to surround the cut-out portions 133 of the web 70 in a manner to form an inlaid sheet to be deposited and glued to the base web 31.

Passing from the cutting rolls 156—156, the skeleton portion is directed downwardly and under the roll 157 and between the pressure rolls 158—158. Mounted in the frame and having one end closely adjacent the space between the cutting rolls 156—156 is a conveyor 159 which is supported on pulleys 160 and 161 and passes over guide pulleys 162 and 163. Positioned at the left hand end of the mechanism as shown in Figure 3, is a winding drum 164 which is adapted to receive the web of inlaid roofing formed at the upper end of the machine and to wind the same into a roll so that it may be stored or subsequently used in connection with the base sheet 31 to form additional roofing material of the type formed at the lower portion of this machine. The winding drum is driven by a slip belt 165 which is in turn driven from a pulley 166 driven by the belt or chain 167 from the sprocket 144. Attention is also directed to the fact that the belt or chain 167 drives the sprocket 168 for rotating the lower cutting roll 156 and also drives the sprocket 160 of the conveyor 159. The upper cutting roll 156 is driven through means of the chain 169 and gears 170 and also the feeding rolls 155 are driven by the chain 171, the upper feeding rolls 148 and 149 being driven therefrom by means of the chain 172. The slip belt 165 employed for driving the drum 164 is of greater length than the distance between the driving and driven shafts so that a slip may be effected when desired, the tension of the belt being determined by the belt tightener 173. This is necessary for the reason that the constantly changing diameter of the drum 164 will require different gearing ratio in order to prevent excessive tension on the inlaid web formed at the upper portion of the machine.

From this mechanism it will be readily understood that the web 70 passing between the rolls 69—69 will be cut to a skeleton portion and individual cut-out portions, and that the skeleton portion will be directed upwardly by the feed rolls 148 and 149 and that the lower portions will be directed downwardly by the conveyor belt 140 and thence horizontally by conveyor belt 143, and also during this operation in proper timed relation therewith, the web 153 will be cut in a manner to form complementary web and cut-out portions, and that the cut-out portions will be directed upwardly by the belt 163 in a manner to underlie the openings formed in the web 132 whereby the web 132 will be caused to interfit with the cut-out portions by the pressure roll 152 to form an inlaid strip of roofing material. Likewise the skeleton portion of the web 153 will be directed downwardly to cause it to interfit in registry with the cut-out portions of the web 70 by the action of the pressure rolls 158 to form an inlaid roofing strip which is directed downwardly on the support 174 and under the pressure roll 175 onto the base web 31 in a manner to form a laminated inlaid roofing strip. From this portion of the machine the strip may be conveyed to a winding roll hereinafter described, in which form it is complete to be used as roofing material.

Referring now to Figure 4, I disclose a third alternative mechanism to be received and supported by the pedestals 51 and 57, which apparatus is adapted to form from the web 70 a plurality of longitudinal strips to be directed downwardly and positioned on the upper surface of the base web 31 to form a strip or laminated sheet of roofing. In this form of my invention, the upper roll of material 66, as shown in Figure 1, and the web 70 are usually of narrower width than the base sheet 31 so that the strip may be cut longitudinally and into a plurality of smaller strips and spaced and deposited on the base sheet as shown in Figure 5. This mechanism comprises a frame 176 having a diagonally disposed guide 177, the upper end of which is positioned in close proximity to the opening between the rolls 69—69. In connection with this mechanism, the rolls 69—69 are of the form shown in Figure 5, having cutting blades 178 cooperating to cut the web 70 into a plurality of strips 179.

Positioned transversely of the guide 177 are bars 180 provided with pins 181 so positioned that they effect a gradual increased spacing between the strips as the strips pass down the guide 177. Depending from the lower portion of the frame 176 is a bracket 182 provided with pressure rolls 183, the lower roll of which is positioned under the conveyor belt 59 so that the roll exerts pressure on opposite sides of the strips cut from the web 70 and of the base web 31. In this case, the heated asphalt is applied to the upper surface of the base web 31 only on those areas which will be subsequently covered by strips 179. The upper roll 183 is constructed with a plurality of enlargements as shown in Figure 5, which are adapted to roll between the individual strips 179 and to aid in finally locating the strips and causing them to adhere to the upper surface of the base web 31.

From the above description of this alternative mechanism of my invention, it will be understood that the web passes between the rolls 69 and is cut into a plurality of strips and is subsequently directed downwardly through such mechanism as to effect a spacing of the individual strips and to be deposited onto the base sheet. There is no feed provided for this mechanism, the strips 179 being drawn through the guide by the pull of the winding device or feeding rolls to which the composite sheet passes after it leaves the apparatus thus referred to.

Referring now to Figure 6, it will be noted that my invention contemplates a mechanism to be positioned at the depositing end of the roofing material machine shown in Figure 1, and one which is provided with a plurality of upper and lower longitudinal transverse cutting rolls which may be selectively employed to form either shingles or transverse strips of roofing as desired, or which may be rendered totally inoperative in the event that strips of roofing are desired, in which case the roll shown at the extreme left hand end of Figure 6 is employed to wind the strip on a winding drum for storage and shipment.

This mechanism comprises a table 184 mounted on legs 185 and 186. The lower end of the leg 186 is provided with a bracket for supporting the guide roll 187 under which the composite web passes to the upper feed rolls 188—188. Positioned on the upper surface of the table are two cutting rolls 189—190, both of which are mounted in longitudinal adjusted brackets as shown in Figure 7, and are capable by means of the hand wheels 191 to be vertically adjusted so that they may cut the web through any desired thickness or may be rendered totally inoperative. The roll 189 is provided with transverse cutting blades and is preferably employed to cut the upper sheet only of the double-ply roofing material supplied thereto. The roll 190 is designed to cut the upper ply only in a longitudinal direction, it being provided with longitudinal cutting blades. Mounted on the under surface of the table 184 are similar rolls 192 and 193 which are adjustable longitudinally and vertically by mechanism similar to that employed in connection with rolls 190 and 191. The roll 192 is designed to cut the lower ply or the base web 31 only of the laminated roofing material, and the roll 193 is designed to cut the lower ply or base web in a transverse manner. It will be noted that the under rolls 192 and 193 are positioned in slots provided in the table 184 and that they have spring mounted plates 194 and 195 positioned thereabove to form a resilient cutting anvil for the blades. The blades are mounted in slidable relation on the bolts 196 having springs 197 positioned therearound and abutting the upper surface of the plates 194. The feed rolls 188 are driven by beveled gear 198 and shaft 199 from the main power shaft 29, and the cutting rolls are all driven by a suitable chain 200 driven from the shaft carrying the lower feed roll 188. In order to effect the proper contacts of the chain 200, idler gears 201 and 202 are provided as shown.

Positioned at the end of the mechanism is an inclined guideway 203 having a plurality of chutes 204 in proper position and of a proper width to receive shingles which may be formed from the strip by the cutting rolls above described. At the bottom of each chute is a box 205 adapted to receive individual shingles.

By the employment of this mechanism, it is sometimes desired to make plain shingles from base strip 31 without the employment of the various alternative mechanisms shown in Figures 1, 3 and 4, and in this event, the base strip 31 will be supplied directly from the asphalt applying rolls and sanding apparatus to the mechanism shown in Figure 6, in which case the rolls 192 and 193 will be employed to form the sheet which is directed into individual shingles. When this is the case, it is desired to stack the shingles into the boxes 205 shown in Figure 7, with alternate shingles placed with opposite faces upward so that the sticky surfaces of adjacent sheets will be placed together. For this purpose I have provided a stacking machine which operates in conjunction with the guide 204 and is timed and constructed to receive alternate groups of shingles cut from the roll 193. In other words, during the operation of the machine, one strip of six shingles will be fed from the roll 193 and will pass down the guides 204, but immediately thereafter the stacking mechanism will be in position to receive the next shingles formed and will act in operation to deposit the shingles so received into the boxes 205 with their opposite faces upward, and so on, the next shingles passing down the chute 204.

The stacking mechanism comprises a pair of pivoted arms 206 positioned on opposite sides of the guide 203 and having a gear segment 207 adjacent the pivot thereof. In mesh with the gear segment 207 is a second gear segment 208 pivoted on the frame and connected for an oscillatory movement by means of the pitman 209 and the rotating wheel 210. The rotating wheel is driven by a chain 211 and beveled gears 212 and 213 from the main power shaft 29. Positioned on the outer ends of the arms 206 is a tray 214 having a lower flange 215, the tray being provided at its upper edge with an upstanding bracket 216 at its opposite sides for receiving a shaft 217. The shaft is provided with a plurality of fingers 218 as shown in Figure 7, which are caused to engage the shingles as they are positioned on the tray and hold them in position, the movement of the fingers being caused by the torsional spring 219 connected between the bracket 216 and the shaft 217. Mounted on one end of the shaft is a finger 220 adapted to engage a lug 221 carried on the frame so that when the tray is in the position shown in Figure 6, the fingers are caused to be lifted an extent sufficient to permit the introduction of the shingles thereunder. However, when the arms move upwardly out of the position shown in Figure 6; the arm 120 moves out of contact with lug 221 whereby the fingers are caused to resiliently engage the shingles to hold them in position on the tray 214. When the shingles have been received on the tray, the arms 206 start to move the tray into a position to overlie the boxes 205. In this position, a gear segment 222, which is also fixed to the end of the shaft 217, engages a rack element 223 mounted as shown in Figure 6 on a stationary part of the frame. This engagement causes a rotation of the shaft 217 in a direction to remove the fingers 218 from engagament with the shingles and permit them to drop into their respective boxes in a manner to effect a stacking of the shingles with their sticky faces together.

Attention is directed to the fact that the arms are driven in synchronism with the feeding of the machine whereby the tray returns to receive alternate groups of shingles fed from the cutting roll 193. The feeding of the strips to this machine is effected entirely by the rolls 188 which is possible due to the fact that they remain in the form of strips until after they pass through the last roll 193 which is the transverse cutting roll for the under surface.

At the extreme end of my machine I have provided a stand 224 in which is mounted the drum 225 driven by means of the belt 226 and gears 227 from the main power shaft 29. The belt 226 is adapted to slip in the same manner as described in connection with the belt 165, shown in Figure 3, and a belt tightener 228 is provided to regulate the tension thereof in a manner to compensate for the constantly increasing size of the roll 225. Also on the stand 224 I provide an idler roll 229 mounted in a guideway 230 so that it will operate by action of gravity to hold the finally formed web in a proper feeding relation to the roll 225.

From a complete understanding of this mechanism, it will be observed that I have provided a machine which has alternative mechanisms for selective employment for the purpose of forming a number of desired kinds of roofing material. When the mechanism shown in Figure 1 is employed, I form a roofing in bas relief having a base sheet with a plurality of shingles positioned thereon of any desired shape and at any angle to the longitudinal. When the type of mechanism shown in Figure 3 is employed, I form a laminated roofing strip having an inlaid sheet placed on the base sheet. When the type of mechanism shown in Figure 4 is employed, I form a plurality of strips placed on the base sheet to form a final roofing product.

Referring to Figures 10 to 20 of the drawings, it will be noted that by the employment of the apparatus shown in Figure 6, I may form from the laminated web fed from any of the alternative machines thus far described, shingles or transverse roofing strips as desired. In the event transverse roofing strips are to be formed, the upper and lower transverse rolls of the mechanism shown in Figure 6 are employed to cut either in registry or in an offset manner, the offset cutting resulting in transverse strips as shown in Figures 13, 16, 18 and 20. When shingles are desired as shown in Figure 11, the longitudinal cutting rolls are employed in addition to the transverse cutting rolls which may be also offset according to the type of roll and to the adjustment of the slots as shown in the frame in Figure 7. It is also possible with my machine to form shingles from the base web only and to stack the shingles by the stacking mechanism with sticky faces together, or to render the mechanism shown in Figure 6 wholly inoperative, in which case the web passes on the winding stand 224 and is wound into a roll 225 in the manner shown.

I claim:

1. In an apparatus for the manufacture of sheet surfacing materials, means for feeding a foundation sheet, means for feeding a sheet the subdivisions of which are to be superposed thereon, means for dividing said second sheet and delivering its subdivisions to said foundation sheet, the last named means comprising cutters adapted to subdivide said second sheet and means adapted to receive and space the separated parts at predetermined angles and apply them in predetermined spaced relation upon the foundation sheet, and means adapted to be selectively employed for dividing the composite sheet into individual elements of different designs.

2. In an apparatus for the manufacture of sheet surfacing materials, means for feeding a foundation sheet, means for feeding a sheet the subdivisions of which are to be superposed thereon, means for subdividing said second sheet and delivering its subdivisions to the foundation sheet, said last named means comprising cutters and separating and distributing means acting upon the subdivisions produced by said cutters and directing them in spaced relation to the foundation sheet, and means adapted to be selectively employed for dividing the composite sheet into individual elements of different designs.

3. In an apparatus for the manufacture of sheet surfacing materials, means for feeding a foundation sheet; means for feeding a sheet the subdivisions of which are to be superposed thereon; means for subdividing said second sheet and delivering its subdivisions to the foundation sheet, the last named mean comprising cutters adapted to subdivide said second sheet in the direction of its feed both on lines longitudinal to the feed and on lines intersecting said longitudinal lines, and means adapted to receive and space the separated parts and apply them in spaced relation upon the foundation sheet; and means adapted to be selectively employed for dividing the composite sheet into individual elements of different designs.

4. In an apparatus for the manufacture of sheet surfacing materials, means for feeding a foundation sheet; means for feeding a sheet the subdivisions of which are to be superposed thereon; means for subdividing said second sheet and delivering its subdivisions to the foundation sheet, the last named means comprising cutters adapted to subdivide said second sheet in the direction of its feed both on lines longitudinal to the feed and on lines intersecting said longitudinal lines, and means adapted to receive and space the separated parts and apply them in spaced relation upon the foundation sheet, comprising receptacles adapted to receive the parts and means for removing the parts individually from said receptacles successively and delivering them to the foundation sheet; and means adapted to be selectively employed for dividing the composite sheet into individual elements of different designs.

5. In an apparatus for the manufacture of sheet surfacing materials, means for feeding a foundation sheet, means for feeding a sheet the subdivisions of which are to be superposed thereon, means for subdividing said second sheet and distributing in predetermined relation its subdivisions to the foundation sheet, the last named means including means for pressing the material of the superposed sheet upon the foundation sheet, and cutting means adapted to be selectively employed for dividing the composite sheet into individual elements of different designs.

6. In an apparatus for the manufacture of sheet surfacing materials, means for feeding a foundation sheet, means for feeding a sheet the subdivisions of which are to be superposed thereon, and means for subdividing and distributing in predetermined relation its subdivisions to the foundation sheet, means for surfacing said sheets, and means adapted to be selectively employed for dividing the composite sheet into individual elements of different designs.

7. In an apparatus for the manufacture of sheet surfacing materials, means for feeding a foundation sheet, means for feeding a sheet the subdivisions of which are to be superposed thereon, means for subdividing the superposed sheet and separating and distributing in predetermined relation its subdivisions to the foundation sheet, means for applying a weather-surfacing material to the subdivisions of the superposed sheet, and means adapted to be selectively employed for dividing the composite sheet into individual elements of different designs.

8. In an apparatus for the manufacture of sheet surfacing materials, means for feeding a foundation sheet, means for feeding a sheet the subdivisions of which are to be superposed thereon, and means for subdividing said second sheet and delivering its subdivisions to the foundation sheet, and means for subdividing said foundation sheet along lines related to the edges of the parts of the superposed sheet.

9. In an apparatus for the manufacture of sheet surfacing material, means for supplying a foundation web. means for supplying a web of material the subdivisions of which are to be superposed thereon, means for dividing said web into pieces embodying different designs, means for separating the pieces of one design from those of another and separately applying them to the foundation sheet, and dividing the resulting sheet into units.

10. In an apparatus for the manufacture of sheet surfacing materials, means for feeding a web of material with adhesive upon the surfaces thereof, means for applying a weathering material to one of the adhesive surfaces of said web while maintaining the other surface in adhesive state, means for subdividing the web so developed to produce pieces of covering layers, means receiving said pieces and delivering them with their weathered and adhesive surfaces presented alternately in opposite directions, and means for feeding a foundation sheet along a predetermined path to receive the pieces in ornamental design.

11. In an apparatus for the manufacture of surfacing material, means for feeding a web of material, means for treating the surfaces of said web, means for subdividing said web into pieces of roofing material, means for stacking subdivisions of such material, means for feeding said subdivisions individually from said stacks to a foundation sheet, and means adapted to be selectively employed for dividing the composite sheet into elements of different designs.

12. In an apparatus for the manufacture of sheet surfacing material, means for feeding a foundation web, means for feeding a web of material the subdivisions of which are to be superposed upon the foundation web, means for subdividing said second web into individual pieces, and means for applying said individual pieces in spaced relation upon the foundation web comprising a feeding apron traveling synchronously with the foundation web and in receiving relation to the subdivisions of said second web and having fingers symmetrically disposed thereon which pick up the individual subdivisions and by timing their path of succession determine their spacing upon the foundation web, said last named means being capable of attachment to the apparatus as a unit.

13. In an apparatus for the manufacture of sheet surfacing material, means presenting a foundation web, means presenting a web of material the subdivisions of which are to be superposed thereon, means slitting said second web into sections, distributing means for spacing the sections so produced and directing them to the foundation web in their spaced relation, and means adapted to be selectively employed for dividing the composite sheet into elements of different designs.

14. In an apparatus for the manufacture of sheet surfacing material, means presenting a foundation web, means presenting a web of material the subdivisions of which are to be superposed thereon, means slitting said second web into sections, distributing means for spacing sections so produced and directing them to the foundation web in their spaced relation, means for surfacing said section with weathering material, and means for dividing the composite sheet into strips.

15. In an apparatus for the manufacture of sheet surfacing material, means for delivering a foundation web, means for delivering a web of material the subdivisions of which are to be superposed upon said foundation web, means for subdividing said second web into individual pieces for developing a pattern upon the foundation web, means receiving the pattern pieces and rotating them to determine their angular positions upon the foundation web, and means for dividing the composite sheet into strips.

16. In an apparatus for the manufacture of sheet surfacing material, means for delivering a foundation web, means for delivering a web of material the subdivisions of which are to be superposed upon said foundation web, means for subdividing said second web into individual pieces for developing a pattern upon the foundation web, and means attachable to the apparatus as a unit for receiving the pattern pieces and rotating them to determine their angular positions upon the foundation web, said last named means comprising rotary trays in the paths of the pieces, and means for imparting rotation to said trays.

17. A process for fabricating ornamental surfacing sheets comprising forming a foundation sheet having selected surface areas provided with a bonding means, feeding said foundation sheet along a predetermined path, dividing a second sheet into subdivisions, and superposing the subdivisions on the selected surface areas of the foundation sheet.

18. A process for fabricating ornamental roofing sheets comprising forming a foundation sheet having spaced surface areas provided with a bonding means, feeding said foundation sheet along a predetermined path, dividing a second sheet into subdivisions, and feeding the subdivisions in spaced relation on the spaced surface areas of the foundation sheet.

19. A process for fabricating ornamental surfacing sheets comprising forming a foundation sheet having selected surface areas adapted to receive individual design elements, feeding said foundation sheet along a predetermined path, preparing a covering sheet in decorative design, severing the covering into individual design elements and applying the individual design elements to the selected surface areas of the foundation sheet.

20. A process for fabricating ornamental roofing sheets comprising forming a foundation sheet having selected surface areas adapted to receive individual design elements, feeding said foundation sheet along a predetermined path, preparing a covering sheet in decorative design, severing the covering into individual design elements, applying the individual design elements to the selected surface areas of the foundation sheet, and cutting the composite sheet into strips.

21. A process for fabricating ornamental roofing sheets characterized by feeding a foundation sheet along a predetermined path, dividing a surfacing web into subdivisions, collecting said subdivisions into stacks, and feeding them individually from the stacks on the surface of the foundation sheet.

22. A process for fabricating ornamental surfacing sheets characterized by feeding a foundation sheet along a predetermined path, dividing a surfacing web longitudinally and transversely into subdivisions, arranging said subdivisions in an angular position, and then applying same to the foundation sheet.

23. A process for fabricating ornamental relief building covering comprising applying pieces of contrasting colored material to a foundation to provide a surfacing layer of desired pattern having said pieces set off in relief, attaching said pieces to said foundation and subjecting the composite structure to pressure to compact same.

24. A process for fabricating ornamental inlaid building covering comprising applying a skeleton or stencil member provided with spaced apart recesses to a foundation, inserting material of contrasting color in the recesses in the skeleton or stencil member to provide inlays, attaching the inlays to the foundation and subjecting the composite structure to pressure to compact same.

25. A process for fabricating ornamental relief building covering comprising applying pieces of contrasting colored material to a foundation with an intervening space between said pieces to set them off in relief, attaching the pieces to the foundation, and subjecting the composite structure to pressure for compacting said pieces and said foundation.

ALBERT C. FISCHER.